J. M. EADIE.
BRACE FOR VEHICLE RUNNING GEAR.
APPLICATION FILED OCT. 16, 1915.
1,272,025.
Patented July 9, 1918.
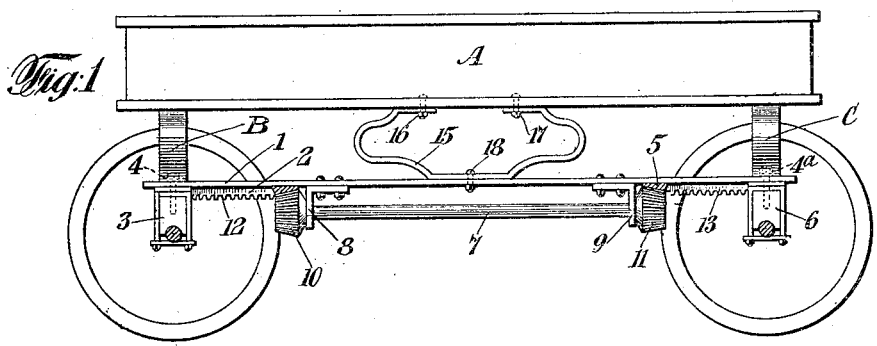
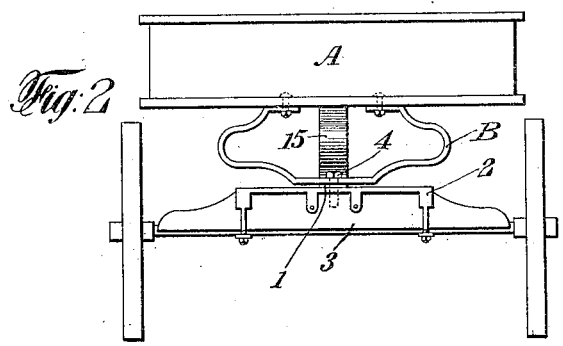
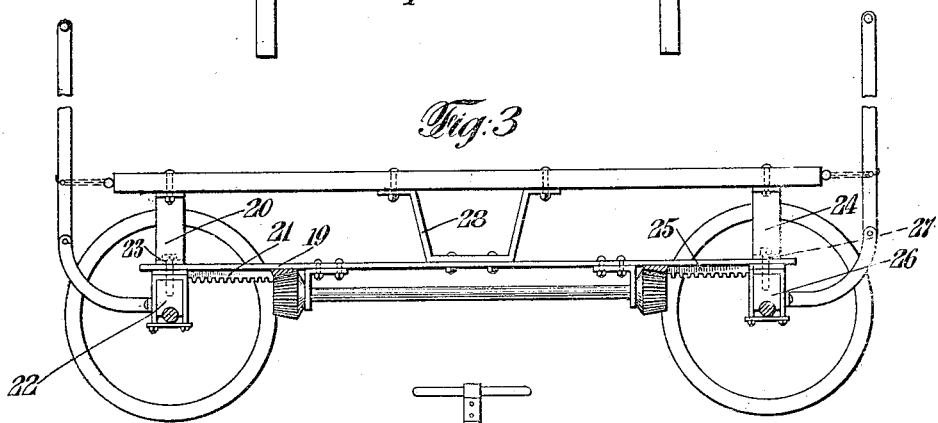
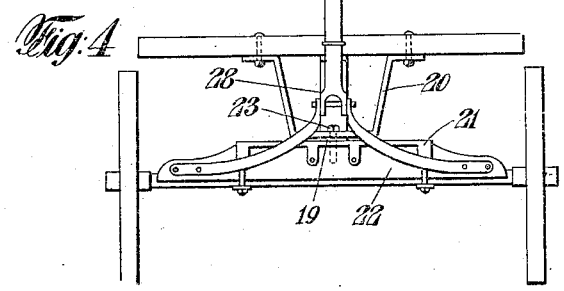
INVENTOR
John M. Eadie
BY Kenyon & Kenyon
His ATTORNEYS

UNITED STATES PATENT OFFICE.

JOHN M. EADIE, OF NEW YORK, N. Y.

BRACE FOR VEHICLE RUNNING-GEAR.

1,272,025.

Specification of Letters Patent.     Patented July 9, 1918.

Application filed October 16, 1915.  Serial No. 56,205.

*To all whom it may concern:*

Be it known that I, JOHN M. EADIE, a citizen of the Dominion of Canada, and a resident of the borough of Manhattan, city, county, and State of New York, have invented certain new and useful Improvements in Braces for Vehicle Running-Gear, of which the following is a specification.

My invention relates to braces for vehicle running gear, and particularly to running gear of the two turning axle type. Such running gear consists ordinarily of two pivoted axles mechanically connected together, so that they will turn oppositely and simultaneously on their pivot points, and it will be apparent since the loads of such vehicles must be carried upon the two pivot points and their respective bearing plates, that the ordinary braces necessary to withstand distortions of the running gear and excessive strain upon the king-bolts or axle pivots cannot be used. My invention is therefore directed toward providing braces adaptable for use either when the vehicle body is resiliently mounted or when it is rigidly mounted on the running gear, which will protect the axles, king-bolt, and cross supports from danger of upsetting as a result of end thrust, will steady and support the automatic steering mechanism, and may be cheaply and easily applied to vehicles already equipped with short turn gear.

Further objects and advantages of my invention will more clearly appear from the following detailed description taken in connection with the annexed drawings, in which like reference characters indicate like parts.

Figure 1 is a side view of a spring mounted vehicle showing one form of bracing embodying my invention. Fig. 2 is an end view of the same. Fig. 3 is a side view of a truck rigidly mounted on the running gear and shows a form of my invention suitable to such a mounting; and Fig. 4 is an end view of Fig. 3.

In Figs. 1 and 2, the vehicle body A is mounted upon transverse springs B and C of any desired type. The reach 1 is attached to the front spring B and pivoted to the fifth wheel 2 and front axle 3 by the king-bolt 4, which is secured to the axle 3 in any suitable manner. The rear transverse spring C is similarly attached to the other end of the reach 1 and pivoted to the sixth wheel 5 and rear axle 6 by the king-bolt 4ª. The short-turn device is illustrated by the shaft 7 hung from the reach 1 by brackets 8 and 9 and having pinions 10 and 11 at its ends to engage segmental racks 12 and 13 on the lower faces of the fifth wheel 2 and sixth wheel 5. The brace 15 is bolted to the frame of the body as at 16 and 17 and to the reach as at 18, and may be of the form illustrated or of any desired form which will resist forward and back motion of the body relatively to the reach and running gear, but will allow of vertical compression. In fact, I preferably employ a brace which has very slight, if any, resistance to vertical compression, but sturdily opposes a relative longitudinal motion of frame and running gear, and such brace need not be in the form illustrated, but may consist of any other form of construction which is suited to the end stated.

In Figs. 3 and 4 I have shown a modification of my invention for use in vehicles which are rigidly mounted on the running gear. Here the reach 19 is attached to the front brace or bolster 20 and pivoted to the fifth wheel 21 and axle 22 by king-bolt 23, and is similarly attached to the rear brace or bolster 24 and pivoted to the sixth wheel 25 and rear axle 26 by the king-bolt 27. Since the frame is rigidly mounted on the running gear the brace 28 may also be of a rigid type and is preferably located as illustrated in Fig. 3, where it combines the double function of strengthening the king-bolts and bolsters in resisting end thrusts and steadying and supporting the short-turn mechanism.

It is apparent that my invention is applicable to any type of short-turning device having a reach from front to rear axle entirely independently of the other details of construction of the running gear. It relieves the front and rear transverse springs or bolsters of the necessity of taking up longitudinal strains and renders vehicles of this type stronger and more practical than they have previously been, without surrendering any of their other advantages; it also steadies and supports the reach and steering apparatus, thereby bracing the king-bolt and preventing the axles from upsetting.

While I have described my invention in great detail in what I consider to be its preferred embodiments, it will be apparent to those skilled in the art, after understanding my invention, that numerous changes and modifications may be made in the construction and arrangement of parts without departing from the spirit of my invention which I wish to define and limit only by the scope of the following claims.

Having thus described my invention, what I claim as new and desire to secure by Letters Patent, is:—

1. In apparatus of the character described, the combination with a vehicle having means for turning the axles simultaneously, and oppositely, of a vehicle body, a reach, means for supporting the body, and a longitudinal brace attaching the reach to the body of the vehicle.

2. In apparatus of the character described, the combination with a vehicle having means for turning the axles simultaneously, and oppositely, of a vehicle body, a reach, means for supporting the body and a longitudinal brace between the body of the vehicle and the reach located substantially midway between the axles.

3. In apparatus of the character described, the combination with a vehicle having means for turning the axles simultaneously, and oppositely, of a vehicle body, bolsters between the axles and the body of the vehicle, and a reach secured to the bolsters and braced against moving longitudinally with respect to the body.

4. In apparatus of the character described, the combination with a vehicle having means for turning the axles simultaneously, and oppositely, of a vehicle body, a reach connecting the two axles, means mounted on the axles to support the body of the vehicle, and a brace between the body and the reach adapted to relieve the said supporting means from end thrust.

5. In apparatus of the character described, the combination with a vehicle having means for turning the axles simultaneously, and oppositely, of a vehicle body, a reach connecting the two axles, means mounted on the axles to support the body of the vehicle, and a brace between the body and the reach which yields to vertical pressure but opposes relative longitudinal motion of the body and the reach.

6. In apparatus of the character described, the combination with a vehicle having means for turning the axles simultaneously, and oppositely, of a vehicle body, a reach connecting the two axles, means mounted on the axles to resiliently support the body of the vehicle, and a brace between the body and the reach which yields to vertical pressure but opposes relatively longitudinal motion of the body and the reach.

7. In apparatus of the character described, the combination with a vehicle having means for turning the axles simultaneously, and oppositely, of a vehicle body, a reach pivoted to the axles and a longitudinal spring brace between the body of the vehicle and the reach comprising an upper and a lower portion, the upper portion being attached to the body and the lower portion to the reach.

8. In apparatus of the character described, the combination with the front and rear axles of a vehicle, of a vehicle body, a fifth wheel on the front axle, a sixth wheel on the rear axle, racks on said wheels, a shaft having pinions adjacent its ends to engage the racks, a reach pivoted to the axles and supporting the shaft by suitable brackets, and a longitudinal brace between the reach and the body of the vehicle, located at a point about midway between the axles.

9. In apparatus of the character described, the combination with the front and rear axles of a vehicle, of a vehicle body, of a fifth wheel on the front axle, a sixth wheel on the rear axle, racks on said wheels, a shaft having pinions adjacent its ends to engage the racks, a reach pivoted to the axles and supporting the shaft by suitable brackets, springs mounted on the axles to support the body of the vehicle, and a brace attached to the body and to the reach which offers slight resistance to vertical pressure but opposes longitudinal motion of the body relatively to the reach.

10. In apparatus of the character described, the combination with the front and rear axles of a vehicle, of a vehicle body, a fifth wheel on the front axle, a sixth wheel on the rear axle, racks on said wheels, a shaft having pinions adjacent its ends to engage the racks, a reach pivoted to the axles and supporting the shaft by suitable brackets, means mounted on the axles to support the body of the vehicle, and a spring brace between the body and the reach which offers slight resistance to vertical pressure but opposes longitudinal motion of the body relatively to the reach.

11. In apparatus of the character described, the combination with the front and rear axles of a vehicle, of a vehicle body, a fifth wheel on the front axle, a sixth wheel on the rear axle, racks on said wheels, a shaft having pinions adjacent its ends to engage the racks, a reach pivoted to the axles and supporting the shaft by suitable brackets, means mounted on the axles to support the body of the vehicle, and a longitudinal spring brace between the body and the reach comprising an upper and a lower compression portion, the upper portion being attached to the body and the lower portion to the reach.

In testimony whereof, I have signed my name to this specification.

JOHN M. EADIE.

Copies of this patent may be obtained for five cents each, by addressing the "Commissioner of Patents, Washington, D. C."